Patented Nov. 6, 1951

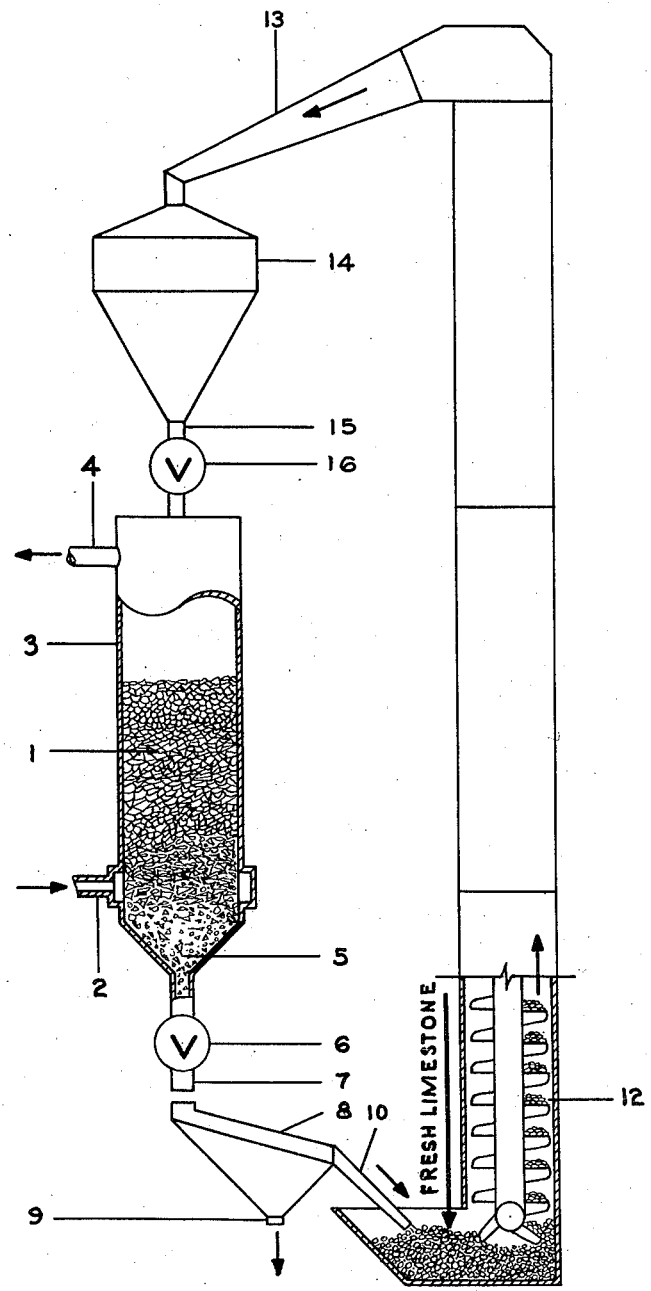

UNITED STATES PATENT OFFICE 2,573,704

MAKING CALCIUM FLUORIDE

Nathan Gilbert, Sheffield, and Isaac A. Hobbs, Florence, Ala., assignors to Tennessee Valley Authority, a corporation of the United States Application February 27, 1950, Serial No. 146,542

5 Claims. (Cl. 23—88)

(Granted under the act of March 3, 1883, as amended April 30, 1928; 370 O. G. 757)

The invention herein described may be manufactured and used by or for the Government for governmental purposes without the payment to us of any royalty therefor.

This invention relates to improved processes for the production of calcium fluoride by absorbing hydrogen fluoride in limestone. This application is a continuation-in-part of our application Serial No. 80,052, filed March 7, 1949, now abandoned, entitled Making Calcium Fluoride.

Large quantities of gases containing hydrogen fluoride and/or silicon tetrafluoride but which are otherwise inert toward limestone are evolved in many industrial operations. These gases may frequently contain so much hydrogen fluoride and/or silicon tetrafluoride as to cause atmospheric pollution in the vicinity of commercial installations. Silicon tetrafluoride hydrolyzes very readily in the presence of moisture to yield hydrofluoric acid and is therefore substantially equivalent to the latter in atmospheric pollution.

In the nodulizing process of preparation or treatment of phosphate rock to produce fertilizer and stock feed by heating the rock in the presence of silica and water vapor, large quantities of such fluorine-containing gases sometimes are evolved. The fluorine is present in such gases principally in the form of hydrogen fluoride, formed principally according to the equation

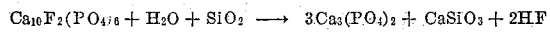

$$Ca_{10}F_2(PO_4)_6 + H_2O + SiO_2 \longrightarrow 3Ca_3(PO_4)_2 + CaSiO_3 + 2HF$$

Although it is well known that the deposits of fluospar suitable for use as a fluxing agent in the manufacture of open-hearth steel are limited and this material is frequently in short supply, only a small proportion of such fluorine-containing waste gases has been utilized in the production of calcium fluoride.

Calcium fluoride produced for metallurgical purposes must usually contain not less than 85 per cent calcium fluoride to be salable. It is obvious that calcium fluoride meeting this requirement for purity might be produced by absorbing the hydrogen fluoride content of such gases in limestone of suitable purity, provided that the reaction between the gases and limestone can be induced to go sufficiently near completion.

A principal difficulty in carrying out such processes arises from the fact that calcium fluoride formed on ordinary crystalline limestone builds up into a dense, strongly retained envelope upon the surfaces of individual particles of the limestone and protects the interior from contact with such gases. It has been necessary to use prolonged exposure of limestone to hydrogen fluoride-containing gases, or to use some manner of removing the calcium fluoride coating from limestone particles. Heating the limestone bed above 1300° C. has been used, as is shown in U. S. Patent 2,410,043, for the purpose of melting the calcium fluoride and causing it to flow out of the bed of lime.

Various types of wet treatments of the partially reacted limestone for removal of calcium fluoride have also been suggested.

Such methods are necessarily rather expensive or complicated in operation and can be used commercially only when favorable cost conditions are present. An inexpensive and simple method of producing calcium fluoride by reaction between waste hydrogen fluoride containing gases and limestone is greatly desired in the art.

It is an object of this invention to provide a cheap and simple process for producing calcium fluoride from gases containing hydrogen fluoride and limestone.

Another object is to provide such a process which is capable of utilizing waste gases and which substantially decreases the hydrogen fluoride content of such gases.

Other objects and advantages will become apparent from the following description and the attached drawing.

We have now found that oolitic and pisolitic limestones are dimensionally unstable in reactions forming calcium fluoride. Such limestones are characterized by granular structure: oolitic limestones being made up of small granules, and pisolitic limestones or granules of larger size held in a matrix of crystalline material. These types of limestone are of fairly widespread occurrence in nature and are described in standard textbooks on mineralogy. We have found that much decrepitation occurs when such limestones react to form calcium fluoride and that, as a result, much of the calcium fluoride produced is in the form of powder.

While a coating of calcium fluoride forms on the surfaces of such limestones as the reaction proceeds, we have found that this coating is very loosely attached and may be removed by slight agitation. In practice, we found that the slight degree of vibration imparted to a bed of limestone by passing a stream of gases through it is usually sufficient to dislodge a large part of such coatings and to cause loose, finely divided calcium fluoride formed by decrepitation and from such dislodged coatings to sift downward and accumulate in a lower part of the limestone bed. Passing a hydrogen fluoride-containing gas upward through a bed of limestone also results in the occurrence of the greater part of the reaction in the lower part of the bed. As a result of these two factors, the greater part of the calcium fluoride produced is present in the lower part of the limestone bed.

Accordingly, we have developed a process for the production of calcium fluoride which comprises passing gases containing hydrogen fluoride through a bed of coarse particles of oolitic and/or pisolitic limestone; maintaining the temperature of said bed and gases in contact therewith in the temperature range above the dew point of said gases and below the decomposition point of said limestone; and separating a lower portion of said bed into two fractions, namely, a fraction consisting of fine particles composed principally of calcium fluoride and a fraction consisting of coarser particles composed principally of unreacted limestone.

The attached drawing shows diagrammatically one type of equipment in which our novel process may be carried out.

With reference thereto, the numeral 1 indicates a bed of oolitic or pisolitic limestone particles. To avoid unnecessary size of equipment, this bed is preferably confined within an upright tower 3, having suitable connections 2 and 4 as inlet and outlet for gases. The individual particles in bed 1 are preferably of sizes within the range from ¼ inch to 2 inches. Smaller sizes may be used, if desired, but the use of small sizes causes an undesirably large pressure drop through the limestone bed. This may make operation difficult. Use of larger sizes also is possible, but since the surface of reacting limestone per volume of packing decreases with increase in the size of the particles the use of large-sized particles requires a tower of greatly increased size in order to give sufficient contact between the gas and the solid particles of limestone. Fluorine-containing gases from any suitable source enter, via line 2, pass upward through bed 1, and leave tower 3 via line 4 substantially depleted in fluorine content.

It is necessary, for best operation, to limit the temperature of absorption to the range between the dew point of the gases and the temperature at which limestone decomposes, usually about 825° C., as lime does not react efficiently with hydrogen fluoride. At temperatures below the dew point of the gases, small quantities of moisture are deposited on the surfaces of the particles of limestone and, as much decrepitation occurs during the reaction, the calcium fluoride powder which is thrown off has a tendency to stick together and form an impervious bed if moisture is present. At temperatures above 825° C., limestone loses carbon dioxide and forms lime which is inefficient for absorbing hydrogen fluoride. We have found that the reaction occurs well in the range from room temperature up to the decomposition point of limestone. Since waste fluorine-containing gases are usually above the temperature of their dew point, these may usually be used without the application of any heat whatever.

As the gases flow upward through bed 1 the reaction occurs, accompanied by much decrepitation. The slight degree of vibration imparted to the limestone particles by the upward-flowing gas also removes some calcium fluoride formed on the surfaces of these particles. This calcium fluoride works downward through the bed and accumulates in region 5. A portion of the limestone bed is then withdrawn via valve 6 and line 7 to a means 8 for separating fine and coarse particles. Means 8 is preferably a vibrating screen mounted within an enclosure, although other means for classification of solid materials according to size may be substituted therefor if desired. A fine fraction, consisting of fine particles composed principally of calcium fluoride, is withdrawn via line 9; and a fraction consisting of coarse particles is removed from means 8 via line 10. These coarse particles may preferably be recycled to the bed 1 by suitable means, shown as a bucket conveyor 12, chute 13, hopper 14, and line 15 containing valve 16. By recycling coarse particles of limestone and adding fresh limestone particles as needed at a suitable location in the system such as is shown by an arrow and the legend "Fresh Limestone," the limestone bed 1 is maintained at approximately constant volume.

*Example*

Waste gases, from a process for the defluorination of phosphate rock by fusing in the presence of silica and water vapor, were passed through beds of oolitic and pisolitic limestone of various sizes in the range from ¼ inch to 2 inches. An apparatus similar to that shown in the attached drawing was used. Separation of fine and coarse particles was made by shaking a withdrawn portion of limestone on a vibrating screen having 6 meshes to the inch. The results, listed below, were obtained in five operating periods.

| | Period | | | | |
|---|---|---|---|---|---|
| | 1 | 2 | 3 | 4 | 5 |
| Operating time, hr | 150 | 102 | 107 | 70 | 98 |
| Gas flow rate through tower, c. f. m. (N. T. P.) | 274 | 276 | 354 | 275 | 275 |
| Gas temperature, °F.: | | | | | |
| Tower inlet | 740 | 720 | 770 | 600 | 600 |
| Tower outlet | 520 | 475 | 590 | 440 | 450 |
| Pressure drop across tower, in. $H_2O$ | 1.4 | 1.1 | 2.2 | 0.8 | 1.2 |
| Minus 6-mesh material removed from tower: | | | | | |
| Lb./day | 164 | 185 | 264 | 231 | 179 |
| Per cent $CaF_2$ | 87 | 85 | 85 | 85 | 88 |
| Plus 6-mesh material recycled to tower, lb./day | 1,959 | 1,953 | 1,875 | 1,938 | 1,983 |
| Fresh limestone added, lb./day | 263 | 286 | 396 | 318 | 252 |
| Gas sampling data, F content, lb./1000 cu. ft. dry gas (N. T. P.): | | | | | |
| Inlet | 0.24 | 0.34 | 0.25 | 0.22 | 0.21 |
| Outlet | 0.023 | 0.037 | 0.033 | 0.031 | 0.025 |
| F removed by limestone, per cent of F in inlet gas | 90 | 89 | 87 | 86 | 88 |

Inspection of these results shows that continuous production of calcium fluoride having 85 per cent or more pure calcium fluoride content was obtained under steady-state conditions. The waste gases, which originally contained sufficient hydrogen fluoride to cause atmospheric pollution in the vicinity of the plant, were substantially depleted in their fluorine content, i. e., the fluorine content of gas leaving the limestone tower was of the order of one-tenth of the fluorine content of the gases entering the tower. Such gases are sufficiently free from fluorine that may be discharged into the atmosphere in large quantities without atmospheric pollution. Very slight agitation of the withdrawn limestone portion on an ordinary vibrating screen was sufficient to remove the greater portion of the fluorine envelope from the individual particles of the limestone used. Coarser portions were combined with fresh limestone and recycled. These coarser particles contained some fluorine as calcium fluoride, but were not covered with an envelope of sufficient density to prevent free absorption of further amounts of hydrogen fluoride.

The process of separating the lower portion of the limestone bed into fine and coarse fractions may be carried out either within or without tower 3. Nothing in this application is intended to exclude the use of a vibrating screen on which the bed of limestone rests within the tower. When apparatus of this type is used, the step of recycling the resulting coarse fraction to the bed is unnecessary as the coarse material is retained in the limestone bed. This may be advantageous under some local conditions.

Having described our invention and explained its operation, we claim:

1. In a process for the production of calcium fluoride wherein gases containing hydrogen fluoride but which are otherwise inert toward limestone are passed over and in intimate contact with limestone and the resulting calcium fluoride is separated from unreacted limestone, that improvement which comprises passing such gases containing hydrogen fluoride upward through a bed of coarse particles of a material selected from the group consisting of oolitic and pisolitic limestone; maintaining the temperature of said bed and gases in contact therewith in the range above the dew point of said gases and below the decomposition point of said limestone; and separating a lower portion of said bed into two fractions, namely, a fraction consisting of fine particles composed principally of calcium fluoride and a fraction consisting of coarser particles composed principally of unreacted limestone.

2. In a process for the production of calcium fluoride wherein gases containing hydrogen fluoride but which are otherwise inert toward limestone are passed over and in intimate contact with limestone and the resulting calcium fluoride is separated from unreacted limestone, that improvement which comprises passing such gases containing hydrogen fluoride upward through a bed of coarse particles of a material selected from the group consisting of oolitic and pisolitic limestones; maintaining the temperature of said bed and gases in contact therewith in the range above the dew point of said gases and below 825° C.; and separating a lower portion of said bed by screening it into two fractions, namely, a fraction consisting of fine particles composed principally of calcium fluoride and a fraction consisting of coarser particles composed principally of unreacted limestone.

3. In a process for the production of calcium fluoride wherein waste gases containing hydrogen fluoride but which are otherwise inert toward limestone are passed over and in intimate contact with limestone and the resulting calcium fluoride is separated from unreacted limestone, that improvement which comprises passing such waste gases upward through a bed of coarse particles of a material selected from the group consisting of oolitic and pisolitic limestones in a reaction zone; maintaining the temperature in said reaction zone above the dew point of said waste gases and below the decomposition point of said limestone; withdrawing waste gases substantially depleted in hydrogen fluoride content from said reaction zone; and separating a lower portion of the limestone bed into two fractions, namely, a fraction consisting of fine particles composed essentially of calcium fluoride and a fraction consisting of coarser particles composed essentially of unreacted limestone.

4. In a process for the production of calcium fluoride wherein waste gases containing hydrogen fluoride but which are otherwise inert toward limestone are passed over and in intimate contact with limestone and the resulting calcium fluoride is separated from unreacted limestone, that improvement which comprises passing such waste gases upward through a bed of coarse particles of a material selected from the group consisting of oolitic and pisolitic limestones in a reaction zone; maintaining the temperature in said reaction zone above the dew point of said waste gases and below 825° C.; withdrawing waste gases substantially depleted in hydrogen fluoride content from said reaction zone; withdrawing a lower portion of limestone bed; and separating the withdrawn portion by screening into two fractions, namely, a fraction consisting of fine particles composed essentially of calcium fluoride and a fraction consisting of coarser particles composed essentially of unreacted limestone.

5. In a process for the production of calcium fluoride wherein waste gases containing hydrogen fluoride but which are otherwise inert toward limestone are passed over and in intimate contact with limestone and the resulting calcium fluoride is separated from unreacted limestone, that improvement which comprises passing such waste gases upward through a bed of particles of such sizes as to pass through a screen having 2-inch openings and to be retained on a screen having ¼-inch openings in a reaction zone, said particles consisting of a material selected from the group consisting of oolitic and pisolitic limestones; maintaining the temperature in said reaction zone above the dew point of said waste gases and below the decomposition point of said limestone; withdrawing waste gases substantially depleted in hydrogen fluoride content from said reaction zone; withdrawing a lower portion of the limestone bed; separating the withdrawn portion, by screening on a vibrating screen having 6 meshes to the inch, into a fraction consisting of fine particles composed essentially of calcium fluoride and a fraction consisting of coarser particles composed essentially of unreacted limestone; and recycling the coarser fraction to an upper part of the limestone bed.

NATHAN GILBERT.
ISAAC A. HOBBS.

REFERENCES CITED

The following references are of record in the file of this patent:

UNITED STATES PATENTS

| Number | Name | Date |
|---|---|---|
| 2,410,043 | Breton et al. | Oct. 29, 1946 |

OTHER REFERENCES

"Recovery of Fluorine from Stack Gases," by T. P. Hignett and Siegel, Ind. and Eng. Chem., November 1949, pages 2493–2498.

J. W. Mellor's "Inorganic and Theoretical Chemistry," vol. 3, 1923 ed., pages 688, 815, Longmans, Green & Co., N. Y., publishers.